(No Model.)

A. SPRINGER & F. A. ROEDER.
F. Davis, administrator of F. A. Roeder, deceased.
TORSIONAL BALANCE.

No. 339,947. Patented Apr. 13, 1886.

Attest:
C. F. Chappell
Thos. G. Bishop

Inventor:
Alfred Springer
Frederick A. Roeder
per
L. M. and Amstosea
Attys.

UNITED STATES PATENT OFFICE.

ALFRED SPRINGER AND FREDERICK A. ROEDER, OF CINCINNATI, OHIO, FRANK DAVIS ADMINISTRATOR OF SAID ROEDER, DECEASED, ASSIGNORS, BY MESNE ASSIGNMENTS, TO THE UNITED STATES TORSION BALANCE AND SCALE COMPANY, OF JERSEY CITY, NEW JERSEY.

TORSIONAL BALANCE.

SPECIFICATION forming part of Letters Patent No. 339,947, dated April 13, 1886.

Application filed August 1, 1884. Serial No. 139,365. (No model.)

*To all whom it may concern:*

Be it known that we, ALFRED SPRINGER and FREDERICK A. ROEDER, citizens of the United States, residing at Cincinnati, Ohio, have invented new and useful Improvements in Torsional Balances, of which the following is a specification.

Our invention relates to balances or weighing-scales employing elastic pivots acting torsionally, instead of the ordinary knife-edge or contact bearings.

In elastic pivot-balances, since the oscillation of the beam is opposed by the molecular resistance of the pivotal supports, the sensitiveness of the balance depends upon the degree to which such resistance is overcome or reduced, which for delicate balances should be to the point where the unbalanced resistance will be just enough to return the beam to its normal or neutral position with equal weights in the scale-pans. It is an essential element in such scales that the center of gravity of the beam structure be above the fulcrum or pivot of oscillation, which may be secured by providing a counterpoise-weight upon an upward projecting standard over the fulcrum, which, by its increasing leverage as the beam "dips," proportionately counteracts the increasing torsional resistance of the pivot, or the beam itself may be so constructed that its center of gravity shall be above the point of support.

The present invention embodies the latter construction; and it consists, first, in a torsional balance in which the beam itself with indicating-weights acts as a poise, dispensing with the vertical standard and weight over the axis of oscillation; second, in means for the adjustment of the torsional pivots in their horizontal distance from each other; third, in means for the relative vertical adjustment of the pivots, to regulate the vertical distance of the center of gravity of the oscillating structure above the point of support to suit the varying needs of use in weighing; fourth, in means for the accurate operation of the scale when standing on an uneven supporting-surface and maintaining the beam in a horizontal position, all as more fully hereinafter described.

Figure 1:
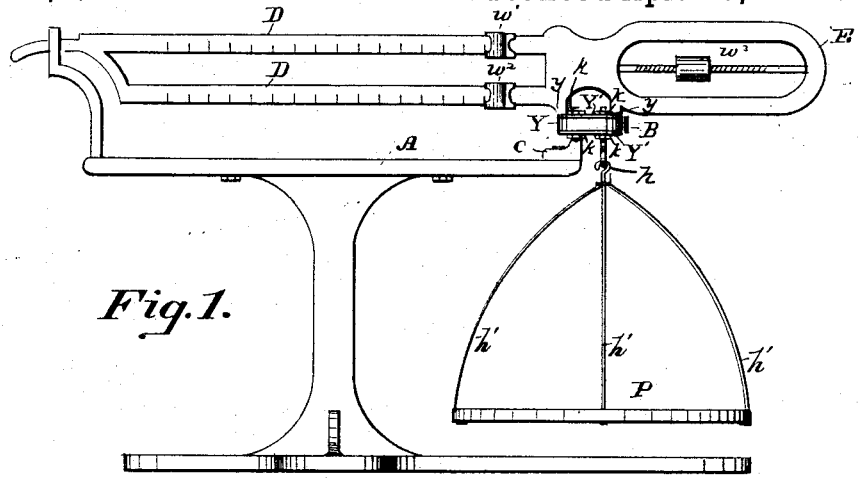
Figure 2:
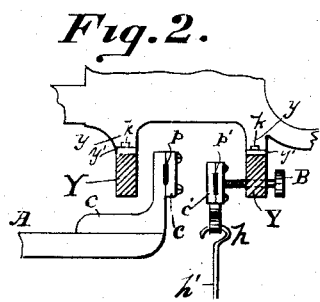
Figure 3:
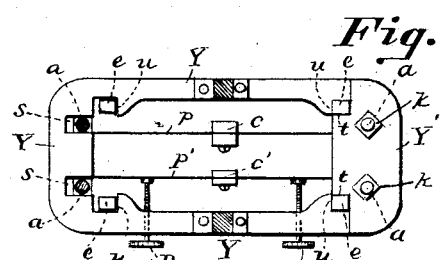
Figure 4:
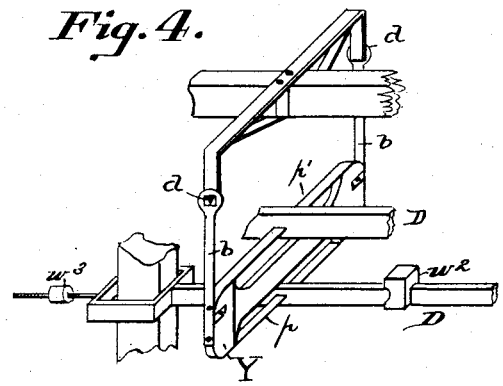
Figure 5:
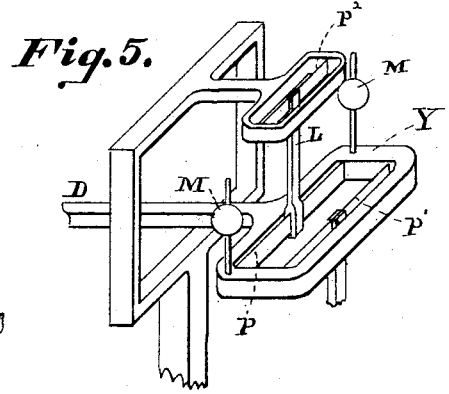

Figure 1 is a side elevation of a "steelyard" scale, the yoke carrying the torsional pivots being attached to or formed upon the scale-beam and moving with it. Fig. 2 is a cross-section of the yoke near the center; Fig. 3, a plan of the yoke, the beam and other parts being removed to more fully show the interior construction at one end. Fig. 4 is a perspective view of a part of a platform-scale, illustrating the suspension apparatus, whereby the beam adjusts itself to an uneven base-support. Fig. 5 is another form of suspension apparatus, the beam D being suspended by a pivotal link, L, from a torsional support, $p^2$, attached to the fulcrum-pivot $p$ of the beam. In such case the poises M may be used, instead of the construction of beam shown in Fig. 1, if desired. In such cases, also, the hanging mechanism may be rested on contact-bearings or torsional pivots, as desired.

In Fig. 1, the scale has a double beam, D D, to the left of the fulcrum, for differential sliding weights, the yoke being attached at the lower part of the double beam, so that the center of gravity of the structure is raised considerably above the support. To balance the weight of beam and sliding weights, the other end is enlarged into an oval head and provided with an adjustable regulating weight, $w^3$.

The general construction of the scale, except as hereinafter pointed out, is similar to the ordinary patterns of knife-edge pivot-scales, and requires no detailed description. The yoke Y is attached to the beam by two feet or lugs, $y$, and contains two bands, rods, or wires, $p\ p'$, stretched between its ends, one of which, $p$, serves as the fulcrum-pivot of the beam structure, and the other, $p'$, as the scale-pan fulcrum. The supporting-fulcrum $p$ is embraced by a bracket or arm, $c$, attached rigidly to the supporting-frame A, and the beam thus upheld, and the pivot $p'$ is clasped by a block, $c'$, having a depending hook, $h$, carrying the scale-pan P by suitable hangers, $h'$.

Sliding differential weights $w'\ w^2$, with proper scale-marks upon the scale-beams D D, furnish means for determining the weight of bodies placed upon the scale-pan, and an adjustable weight, $w^3$, upon the beam extended to the opposite side of the fulcrum, serves to regulate the equilibrium of the beam-structure.

The other pivot-connections will presently be described. It is obvious that oscillation will take place about the pivot $p$ and be opposed by the torsional resistance of the stretched band, wire, rod, or other elastic body employed; also, that the center of gravity of the oscillating structure when the scale is in equilibrium is in the vertical line passing through the pivot $p$. It is further evident that as the beam oscillates the center of gravity will be moved to one side or the other of said vertical line, and the beam will, by its motion, thus aid the torsional action of the pivots. The amount of this action will, of course, depend upon the relative strength of the pivots and the weight of the beam-structure, and will be properly proportioned in manufacture.

Fig. 2 shows the containing-yoke in section, and Fig. 3 the same in plan, the pivots $p\ p'$ being wrapped around squared metallic posts $a$, adapted to fit loosely within open-ended rectangular slots $s$ in the the body of the yoke Y, by which the posts are kept from turning. The posts $a$ have screw-threaded ends, on which nuts, $k$, can be screwed, and covering-plates Y' are provided to fit, one above and one below, the yoke Y, through which the threaded ends of the post $a$ are passed and secured by nuts, $k$, above and below. The posts having the bands, wires, &c., wrapped upon their squared portions may be shifted vertically, and the covering-plates Y' be held firmly against the upper and lower surfaces of the yoke by proper adjustment of the nuts. The plates Y' are further provided with shoulders, as at $t$, and the yoke provided with inwardly-projecting abutments $u$, so that when wedges $e$ are inserted into the openings thus formed, against the abutments, and driven down the plates are driven away from each other, and the bands, wires, &c., will be brought into the proper degree of tension.

The relative vertical position of the bands, wires, or other elastic bodies employed as pivots within the yoke is determined and regulated by manipulating the nuts to shift the holding-posts $a$.

The vertical adjustment of the pivots in relation to the beam-structure is based upon the fact that in scales of this construction the weight of the beam above the fulcrum operates as a poise, and by bringing the suspension-pivot in a line drawn from the end of the beam through the fulcrum the relative lengthening of the arms each side of the fulcrum in oscillation is constant, within the limit of motion of the beam. A practical equilibrium of the beam is maintained by loading the scale in use, leaving the poise-action of the beam unaltered, since the sliding weights move on the horizontal beams and do not alter the height of the center of gravity of the beam-structure.

The proper relative separation of the horizontal planes of the pivots is to be determined by trial after the scale is constructed, as no rule of construction can be here given other than that above mentioned, inasmuch as the vertical change of position caused by the stretching of the pivots under load, their horizontal distance apart, and other varying conditions affecting the problem, cannot be determined with accuracy.

To regulate the horizontal separation of the pivots, or to secure parallelism, thumb-screws B are provided, passing through the outer side of the yoke farthest from the fulcrum, and by their use small adjustments may be made, or the increase or diminution of the weighing leverage attained. Ordinarily, however, such adjustments are to be completed and secured in the manufacture beyond the possibility of ignorant alteration. It is to be observed that this construction allows the scale to be adjusted after all its parts are complete and put together in use.

To obviate the disadvantage of uneven supports for the scale-base, as in the case of platform-scales used upon uneven floors, the last fulcrum-pivot in a series of beams, instead of being attached to a rigid connection, may be held suspended in a link from a point above (so arranged as to allow it to hang vertically) by means of knife-edge or torsion pivots, as illustrated in Figs. 4 and 5.

In Fig. 4 the torsion-frame Y is hung at the points $d$ by means of rods $b\ b$, so that it can swing freely and assume a vertical position, the suspending-pieces $b$ being attached to the sides of the frame itself.

The figure illustrates the case of the last beam in a series of a platform-scale, the others (if more than one be used) not being affected by the uneven position of the scale.

Fig. 5 shows how the ordinary steelyard-scale may be suspended by a torsion-joint, as already explained.

We desire to secure by Letters Patent of the United States, and claim—

1. In a torsional balance, the combination of a scale-pan and a beam provided with a yoke, Y, comprising a frame containing two torsional pivots, $p\ p'$, one of which serves as the fulcrum-pivot of the beam-structure and the other as the scale-pan fulcrum, substantially as described.

2. In a torsional balance, the combination, with a scale-beam and attached yoke having squared slots $s\ s$, of the torsional pivot bands or wires $p\ p'$, squared posts $a\ a$, having screw-threaded ends, and adjusting-nuts $k\ k$, adapted to be adjustably held in the squared slots of the yoke, substantially as described.

3. In a torsional balance, the combination of the slotted yoke Y, formed upon or attached to the scale-beam and provided with abutments $u$, the torsional bands or wire pivots $p\ p'$, holding-posts $a\ a$, covering-plates Y', provided with shoulders $t$, and the insertible wedges $e$, substantially as described.

4. In a torsional balance, the beam D, having yoke Y, provided with slots $s\ s$ and abutment-lugs $u\ u$, in combination with the pivot-holding posts $a\ a$ and wedges $e\ e$, substantially as described.

5. In a torsional balance, the combination, with the yoke Y, of the covering-plates Y′, posts $a$, torsional pivots $p\ p'$, wrapped on said posts, and the nuts $k$ and wedges $e$, for tensioning and adjusting said pivots, substantially as described.

6. In combination with the yoke Y, covering-plates Y′, posts $a$, wedges $e$, and stretched pivots $p\ p'$, the adjusting-screws B, for regulating the parallelism or horizontal distance of the pivots, substantially as described.

7. In combination with the yoke Y and covering-plates Y′, posts $a$, with nuts thereon contained, adapted to shift the vertical position of the bands, &c., substantially as set forth, and for the purpose specified.

8. In a torsion-scale provided with counterpoise-weights M M, the combination of yoke Y, pivots $p\ p'$, stem L, and upper torsion-pivot, $p^2$, adapting the lower beam and yoke to hang horizontal and permit of the proper counterpoise action of the weights M M, substantially as and for the purpose specified.

In testimony whereof we have hereunto set our hands in presence of two subscribing witnesses.

ALFRED SPRINGER.
   FREDERICK A. ROEDER.

Witnesses:
 R. M. HOSEA,
 C. F. SHAPPELL.